US006719419B2

(12) United States Patent
Jones et al.

(10) Patent No.: US 6,719,419 B2
(45) Date of Patent: Apr. 13, 2004

(54) FEED CHANNEL KEYING FOR SOLID INK STICK FEED

(75) Inventors: Brent R. Jones, Tualatin, OR (US); Frederick T. Mattern, Portland, OR (US); Timothy L. Crawford, Saint Paul, OR (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/135,038

(22) Filed: Apr. 29, 2002

(65) Prior Publication Data

US 2003/0202064 A1 Oct. 30, 2003

(51) Int. Cl.[7] ........................ B41J 2/175; G01D 11/00
(52) U.S. Cl. ........................ 347/88; 347/99
(58) Field of Search ........................ 347/88, 99

(56) References Cited

U.S. PATENT DOCUMENTS

| | | | | |
|---|---|---|---|---|
| 5,223,860 A | * | 6/1993 | Loofbourow et al. | 347/88 |
| 5,455,604 A | | 10/1995 | Adams et al. | 346/138 |
| 5,510,821 A | | 4/1996 | Jones et al. | 347/88 |
| D379,639 S | * | 6/1997 | Gilbert | D18/56 |
| 5,734,402 A | | 3/1998 | Rousseau et al. | 347/88 |
| 5,805,191 A | | 9/1998 | Jones et al. | 347/103 |
| 5,861,903 A | | 1/1999 | Crawford et al. | 347/88 |
| D436,124 S | * | 1/2001 | Mattern et al. | D18/56 |
| 6,254,228 B1 | | 7/2001 | Sago | 347/88 |

OTHER PUBLICATIONS

Jones et al., "Feed Guidance and Identification for Ink Stick," U.S. patent application Ser. No. XX/XXX,XXX (Attorney Docket No. D/A2010Q2), filed concurrently herewith.

Jones et al., "Channel Keying For Solid Ink Insertion," U.S. patent application Ser. No. XX/XXX,XXX (Attorney Docket No. D/A2040), filed concurrently herewith.

* cited by examiner

*Primary Examiner*—Lamson Nguyen
*Assistant Examiner*—Leonard Liang
(74) *Attorney, Agent, or Firm*—David J. Arthur

(57) ABSTRACT

A solid ink feed system for a phase change printer includes a solid ink feed channel that has formed in it a feed channel key that either blocks a solid ink stick from complete insertion into the feed channel, or blocks passage of an ink stick along the length of the feed channel, unless the ink stick has a key element corresponding to the feed channel key. A solid ink stick is formed of a three dimensional ink stick body with a key element that extends along a surface of the ink stick body through the rear of the ink stick body.

22 Claims, 9 Drawing Sheets

FEED CHANNEL KEYING FOR SOLID INK STICK FEED

CROSS-REFERENCE TO RELATED APPLICATIONS

Reference is made to commonly-assigned copending U.S. patent application Ser. No. 10/135,156, filed concurrently herewith, entitled "Feed Guidance and Identification for Ink Stick," by Jones et al., and U.S. patent application Ser. No. 10/135,065, filed concurrently herewith, entitled "Channel Keying for Solid Ink Insertion," by Jones et al., the disclosures of which are incorporated herein.

The present invention relates generally to ink printers, the inks used in such ink printers, and the apparatus and method for delivering the ink into the printer.

BACKGROUND

Solid ink or phase change ink printers conventionally receive ink in a solid form and convert the ink to a liquid form for jetting onto a receiving medium. The printer receives the solid ink either as pellets or as ink sticks in a feed channel. With solid ink sticks, the solid ink sticks are either gravity fed or spring loaded through the feed channel toward a heater plate. The heater plate melts the solid ink into its liquid form. In a printer that receives solid ink sticks, the sticks are either gravity fed or spring loaded into a feed channel and pressed against a heater plate to melt the solid ink into its liquid form. U.S. Pat. No. 5,734,402 for a Solid Ink Feed System, issued Mar. 31, 1998 to Rousseau et al.; and U.S. Pat. No. 5,861,903 for an Ink Feed System, issued Jan. 19, 1999 to Crawford et al. describe exemplary systems for delivering solid ink sticks in a phase change ink printer.

SUMMARY

A solid ink feed system for a phase change ink jet printer includes at least one feed channel for solid ink sticks, and feed channel keying means included in the feed channel to block passage along the feed channel of an ink stick that does not have a corresponding ink stick keying means.

An ink stick includes an ink stick body comprising a front surface, a rear surface, and a plurality of longitudinal surfaces connecting the front surface and the rear surface. The ink stick additionally includes at least one key element formed in one of the longitudinal surfaces, in which the key element extends along the longitudinal surface through the rear surface of the ink stick body.

A method of feeding solid ink to the melt plate of a phase change ink jet printer includes placing an ink stick in a solid ink feed channel, moving the ink stick along the solid ink feed channel. The method further includes moving the ink stick past a feed channel key in the solid ink feed channel if the ink stick has a key element corresponding to the key in the solid ink feed channel, and blocking the ink stick at the feed channel key if the ink stick does not have a key element corresponding to the key in the solid ink feed channel.

THE DRAWINGS

DETAILED DESCRIPTION

Figure 1:
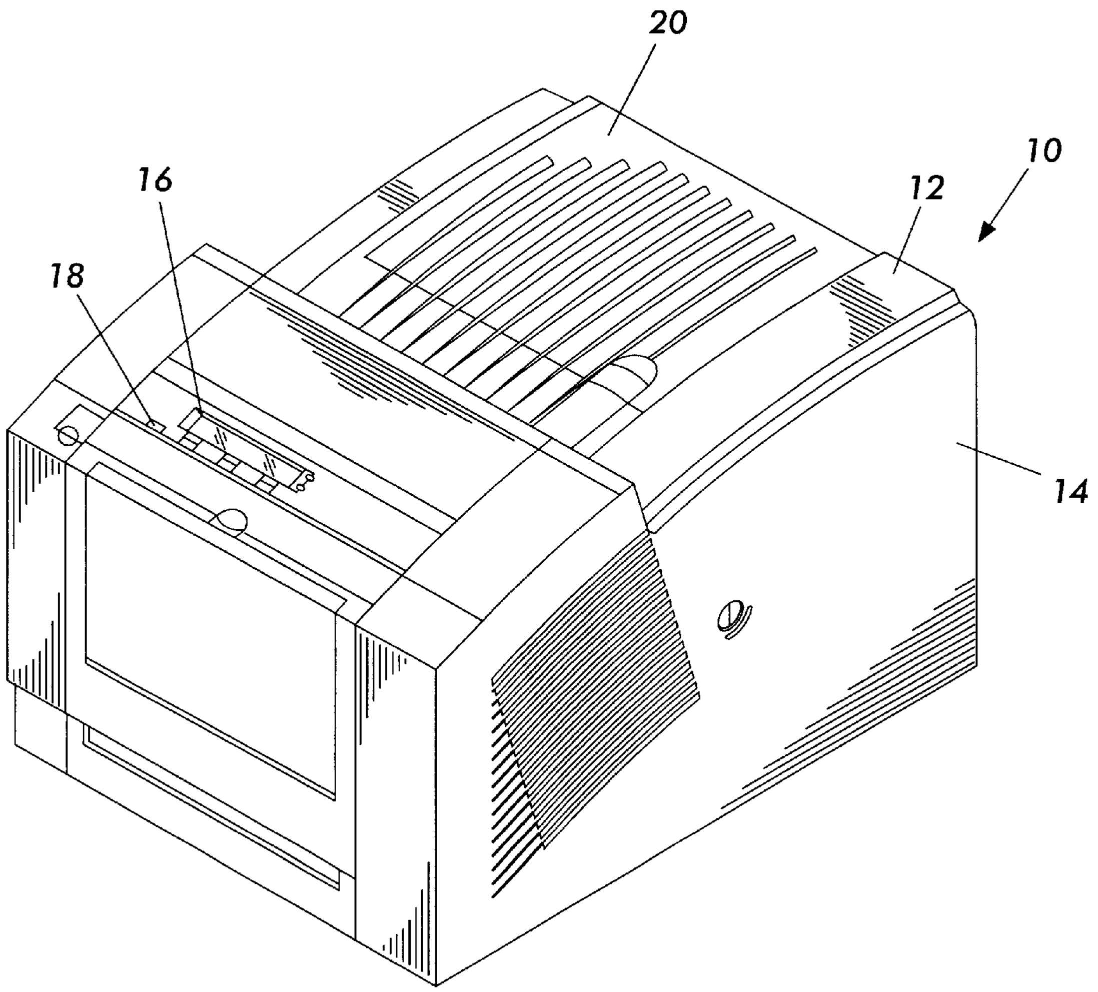
FIG. 1 is a perspective view of a phase change ink printer with the printer top cover closed.
Figure 2:
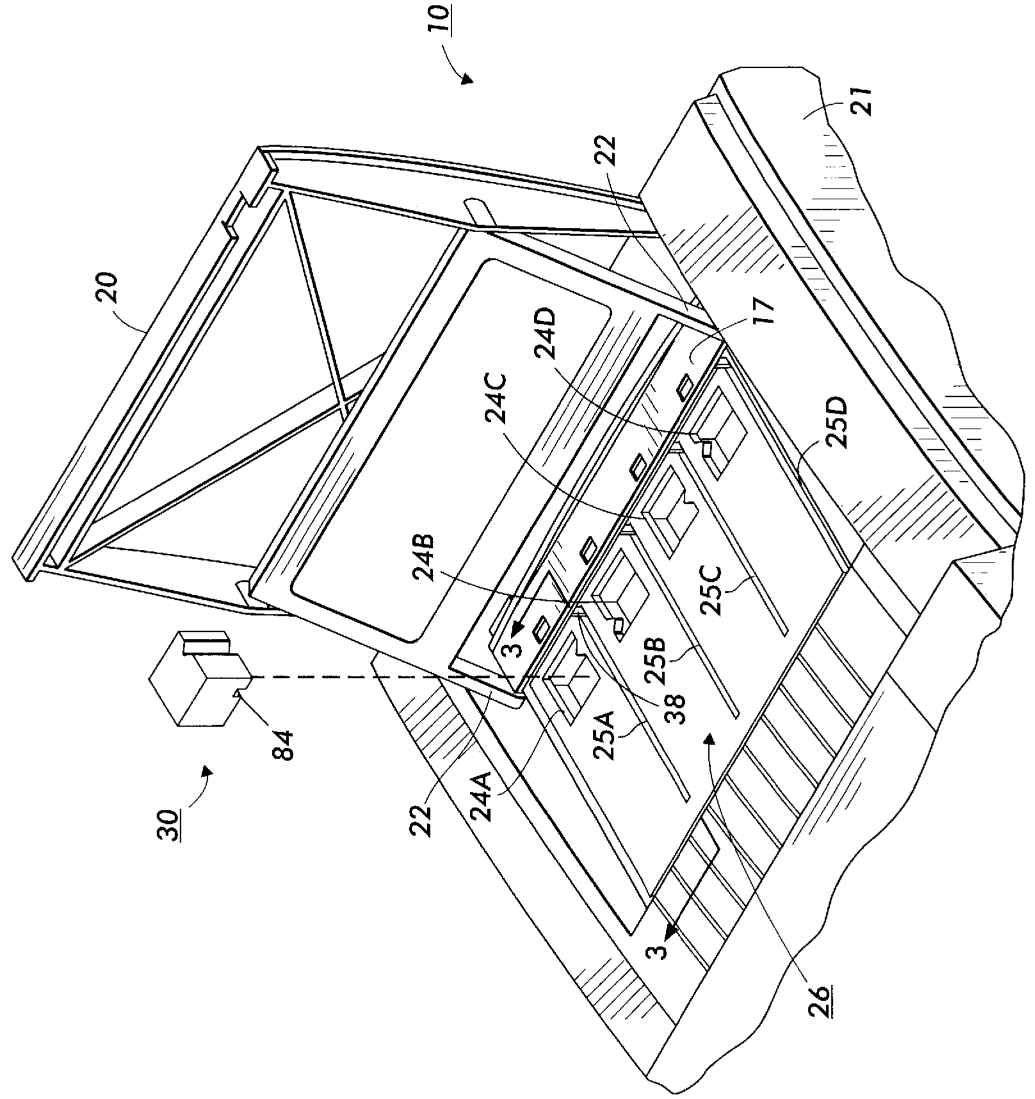
FIG. 2 is an enlarged partial top perspective view of the phase change printer with the ink access cover open, and showing a solid ink stick in position to be loaded into an ink stick feed channel.

FIG. 1 shows a solid ink, or phase change, ink printer 10 that includes an outer housing having a top surface 12 and side surfaces 14. A user interface, such as a front panel display screen 16, displays information concerning the status of the printer, and user instructions. Buttons 18 or other control elements for controlling operation of the printer are adjacent the front panel display screen, or may be at other locations on the printer. An ink jet printing mechanism (not shown) is contained inside the housing. An example is of the printing mechanism is described in U.S. Pat. No. 5,805,191, entitled Surface Application System, to Jones et al., and U.S. Pat. No. 5,455,604, entitled Ink Jet Printer Architecture and Method, to Adams et al. An ink feed system delivers ink to the printing mechanism. The ink feed system is contained under the top surface of the printer housing. The top surface of the housing includes a hinged ink access cover 20 that opens as shown in FIG. 2, to provide the operator access to the ink feed system.

In the particular printer shown, the ink access cover 20 is attached to an ink load linkage element 22 so that when the printer ink access cover 20 is raised, the ink load linkage 22 slides and pivots to an ink load position. The interaction of the ink access cover and the ink load linkage element is described in U.S. Pat. No. 5,861,903 for an Ink Feed System, issued Jan. 19, 1999 to Crawford et al., though with some differences noted below. As seen in FIG. 2, opening the ink access cover reveals a key plate 26 having keyed openings 24A, 24B, 240, 240. Each keyed opening 24A, 24B, 240, 240 provides access to an insertion end of one of several individual feed channels 28 of the solid ink feed system (see FIGS. 2 and 3).

Each longitudinal feed channel 28 delivers ink sticks 30 of one particular color to a corresponding melt plate 32. Each feed channel has a longitudinal feed direction from the insertion end of the feed channel to the melt end of the feed channel. The melt end of the feed channel is adjacent the melt plate. The melt plate melts the solid ink stick into a liquid form. The melted ink drips through a gap 33 between the melt end of the feed channel and the melt plate, and into a liquid ink reservoir (not shown). The feed channels 28 have a longitudinal dimension from the insertion end to the melt end, and a lateral dimension, substantially perpendicular to the longitudinal dimension. Each feed channel in the particular embodiment illustrated includes a push block 34 driven by a driving force or element, such as a constant force spring 36, to push the individual ink sticks along the length of the longitudinal feed channel toward the melt plates 32 that are at the melt end of each feed channel. The tension of the constant force spring 36 drives the push block toward the melt end of the feed channel. In a manner similar to that described in U.S. Pat. No. 5,861,903, the ink load linkage 22 is coupled to a yoke 38, which is attached to the constant force spring 36 mounted in the push block 34. The attachment to the ink load linkage 22 pulls the push block 34 toward the insertion end of the feed channel when the ink access cover is raised to reveal the key plate 26. The constant force spring 36 can be a flat spring with its face oriented along a substantially vertical axis.

A color printer typically uses four colors of ink (yellow, cyan, magenta, and black). Ink sticks 30 of each color are delivered through a corresponding individual one of the feed channels 28. The operator of the printer exercises care to avoid inserting ink sticks of one color into a feed channel for a different color. Ink sticks may be so saturated with color dye that it may be difficult for a printer operator to tell by the apparent color alone of the ink sticks which color is which. Cyan, magenta, and black ink sticks in particular can be difficult to distinguish visually based on color appearance. The key plate 26 has keyed openings 24A, 24B, 240, 24D to aid the printer operator in ensuring that only ink sticks of the proper color are inserted into each feed channel. Each keyed opening 24A, 24B, 24C, 24D of the key plate has a unique shape. The ink sticks 30 of the color for that feed channel have a shape corresponding to the shape of the keyed opening. The keyed openings and corresponding ink stick shapes exclude from each ink feed channel ink sticks of all colors except the ink sticks of the proper color for that feed channel. Various mechanisms for such insertion keying are described in U.S. Pat. No. 5,734,402, Solid Ink Stick Feed System, issued Mar. 31, 1998 to Rousseau et al, and co-pending U.S. patent application Ser. No. 10/135,034, SOLID INK STICK WITH IDENTIFIABLE SHAPE, filed Apr. 29, 2002 by Jones and United State patent application Ser. No. 10/135,049, KEYING FEATURE FOR SOLID INK STICK, filed Apr. 29, 2002 by Jones. The ink sticks illustrated in the present description are shown without insertion key elements around the perimeter of the ink stick. However, most implementations are likely to include such insertion key elements as understood by those skilled in the art.

Feed channel keying means in the solid ink feed channel 28 and the corresponding ink stick 30 provides further protection against an incorrect ink stick reaching the melt plate of the printer. Such feed channel keying means can either prevent the user from fully inserting an improper ink stick into the feed channel, or can block an improper ink stick from moving along the entire length of the feed channel to the heater melt plate.

Figure 3:
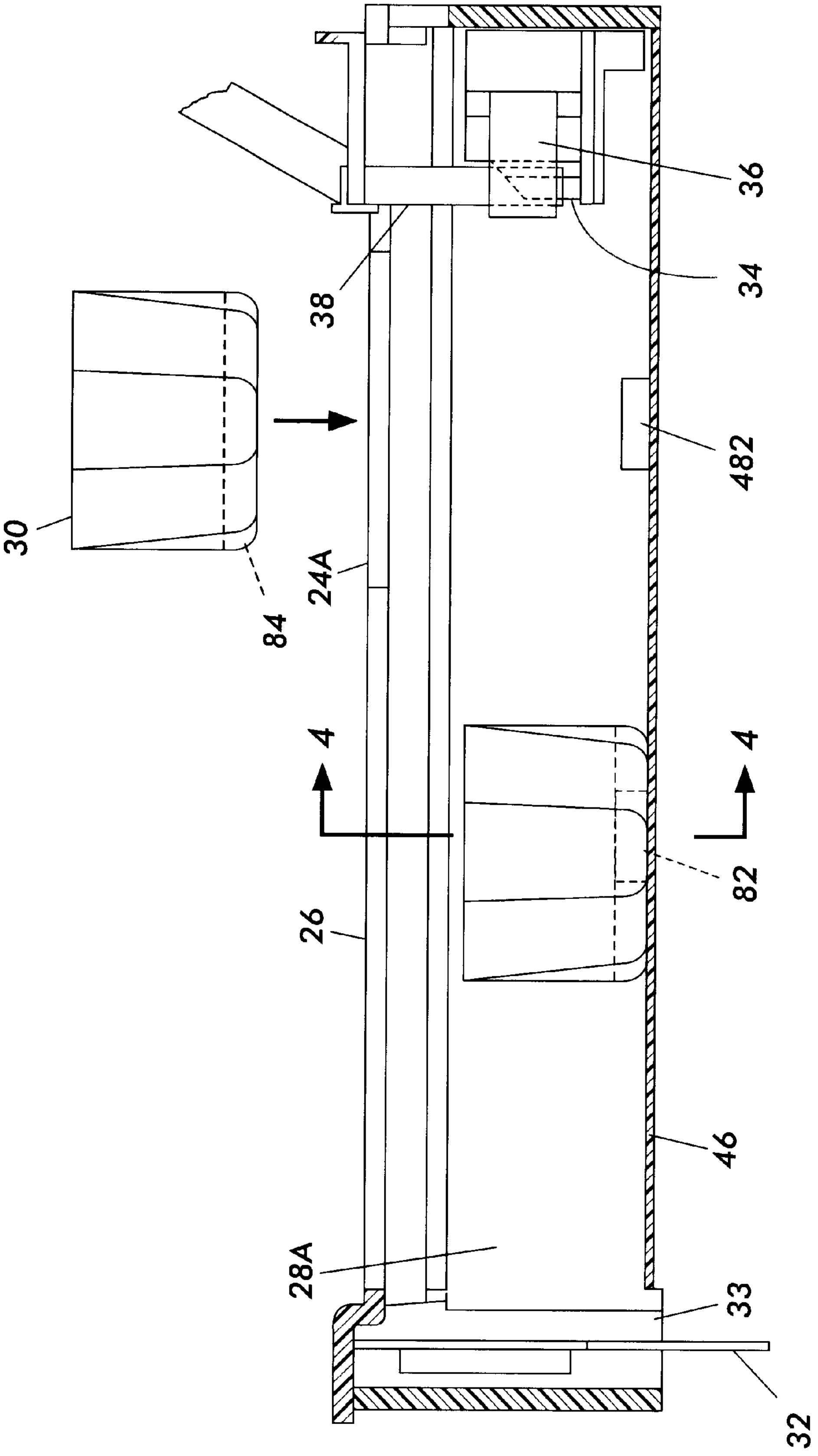
FIG. 3 is a side sectional view of one of the solid ink feed channels of the ink printer, taken along line 3—3 of FIG. 2.
Figure 4:
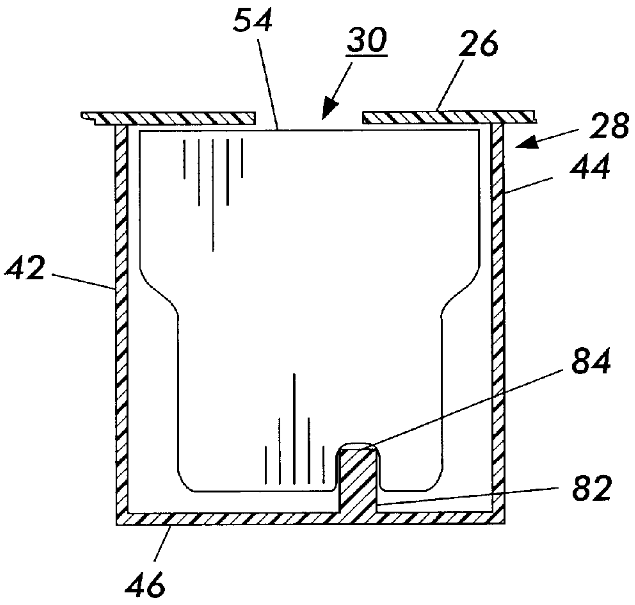
FIG. 4 is a cross-sectional view of one of the solid ink feed channels of the ink printer, taken along line 4—4 of FIG. 3.
Figure 5:
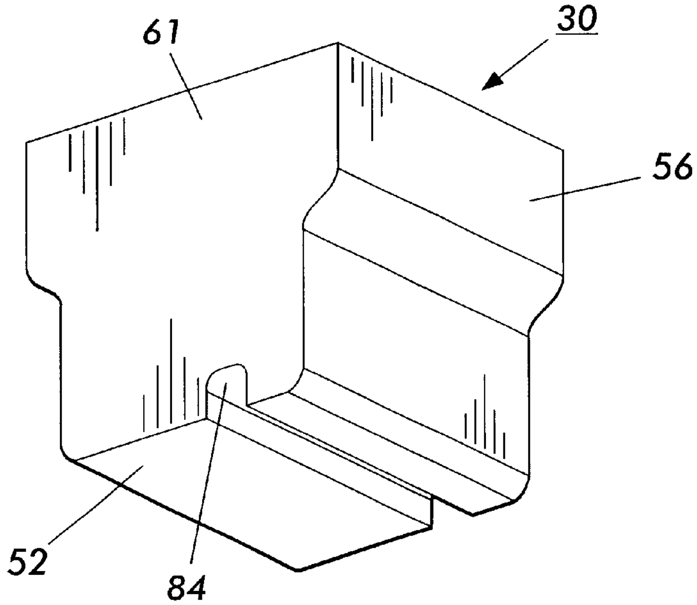
FIG. 5 is a perspective view of one embodiment of a solid ink stick.
Figure 6:
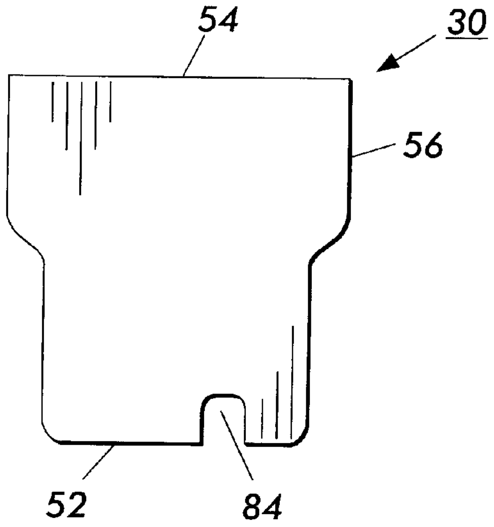
FIG. 6 is a front elevational view of the ink stick of FIG. 5.

Referring to FIGS. 3 and 4, the feed channel keying means includes a key, such as a protruding channel key 82 along the bottom wall 46 of the feed channel 28. The protruding channel key may also be at the top, or in one of the side walls 42, 44 of the feed channel. An ink stick 30 for use in such a keyed feed channel includes a correspondingly shaped ink stick key element 84 that is correspondingly positioned on the ink stick body. For example, referring to the ink stick shown in FIGS. 5 and 6, the ink stick is formed of a three dimensional body of ink material. The surfaces of the ink stick body need not be flat, nor need they be parallel or perpendicular one another. However, these descriptions will aid the reader in visualizing, even though the surfaces may have three dimensional topography, or be angled with respect to one another. The ink stick includes a bottom formed of a bottom extremity, such as a generally bottom surface 52, a top extremity, such as a generally top surface 54, and lateral extremities, such as side surfaces 56. The ink stick body also has a front and a rear, such as front and rear extremities, which in the illustrated embodiment are formed by end surfaces 61. The bottom, top, and lateral side surfaces connect the front and rear of the ink stick body, forming longitudinal surfaces that are substantially parallel the length of the feed channel when the ink stick is properly inserted into the feed channel. The illustrated ink stick body is substantially rectangular in shape. The side surfaces are segmented or stepped, so that the lower portion of the ink stick is slightly narrower than the upper portion. Numerous shapes are possible that will traverse a feed channel, such as the longitudinal feed channel 28. In particular, the lateral side surfaces 56 and the bottom and top surfaces 52, 54 are shown oriented in the longitudinal feed direction, and the end surfaces 61 are transverse to the feed direction. In the particular implementation shown, with a substantially rectangular ink stick body, the end surfaces are substantially perpendicular to the top, bottom, and side surfaces 52, 54, 56. However, such orientation is not essential.

The key element 84 of the ink stick is a longitudinal recess in the ink stick body. The longitudinal recess extends along the length of the ink stick body, or at least that portion of the length that is configured to follow a path that will intersect the key 82 in the feed channel. For an ink stick intended for use in a printer ink feed channel having a channel key 82 in the bottom of the feed channel, the ink stick key element 84 is formed as a longitudinal recess in the bottom 52 of the ink stick body. In the particular ink stick implementation shown in FIGS. 5 and 6 with a substantially flat bottom surface 52, the ink stick key element 84 extends along the entire length of the bottom surface, from one end surface 61 to the opposite end surface. The ink stick key element intersects the end surfaces 61 at the general height of the key element. Thus, additional portions of the ends of the ink stick can extend beyond the portions that intersect with the key element, such as with a non-planar end surface. But, those skilled in the art will recognize that reference to the intersection of the end of the ink stick with the key element pertains to intersecting the key element with that portion of the ink stick body end that is at the height and lateral position of the ink stick key element. The longitudinal recessed ink stick key element extending along the entire length of the ink stick body permits the ink stick to pass the corresponding key 82 in the feed channel as the ink stick moves along the feed channel. The feed channel key 82 blocks passage along the feed channel of an ink stick that does not have an ink stick key element corresponding in shape, size, and position to the feed channel key.

Figure 7:
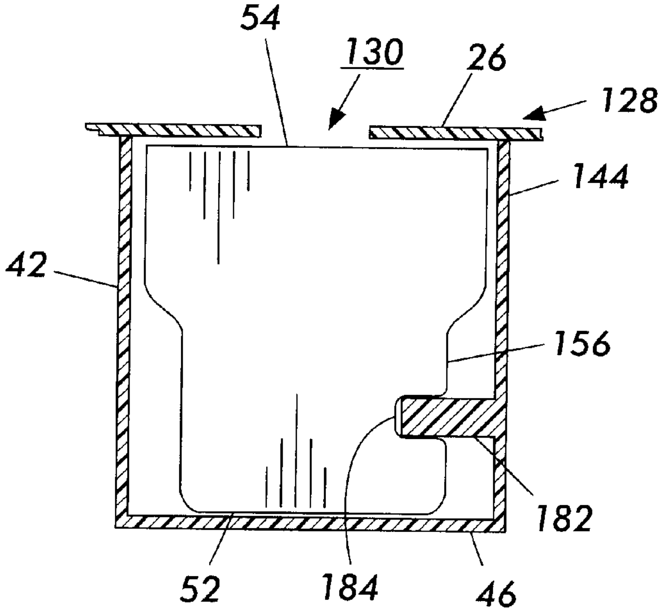
FIG. 7 is a cross-sectional view of another solid ink feed channel.

FIG. 7 is a view similar to that of FIG. 4, except showing an arrangement in which a feed channel key 182 projects from one of the side walls 144 of the feed channel 128. A corresponding ink stick key element 184 formed in the ink stick body 130 is therefore formed in the corresponding lateral side surface 156 of the ink stick body. After studying the above, it will be clear that a feed channel key can be positioned in an upper portion of the feed channel. For example, a feed channel key can project downward into the feed channel from the underside of the key plate cover 26. A corresponding key element formed in the top surface 54 of the ink stick body allows the ink stick to pass such a feed channel key.

The exemplary feed channel keys shown in FIGS. 4 and 7 are substantially rectangular in shape, and relatively small in size. Those skilled in the art will recognize after reading the present description that the feed channel key can take on other shapes and sizes. Different cross-sectional shapes, perpendicular to the direction of ink stick travel along the feed channel, can be used to enhance the ability to distinguish among ink sticks. Such differently shaped keys permit only those with the appropriate correspondingly shaped ink stick key element 84 at the corresponding location relative to the sides of the ink stick body to pass the key 82.

The cross sectional shape perpendicular to the direction of ink stick travel in the feed channel of the ink stick key element 84 corresponds to the cross sectional shape of the feed channel key 82. The ink stick key element can be larger than the feed channel key, although a larger ink stick key element removes usable mass from ink stick. The position of the ink stick key element 84 on the ink stick, relative to the bottom and lateral side surfaces 52, 56 corresponds to the position of the feed channel key 82. Multiple keys in a feed channel can be arranged to enhance the ability to exclude incorrect ink sticks. A first arrangement of feed stick keys permits an ink stick with the correspondingly arranged ink stick key elements to pass, while blocking ink sticks with different arrangements of ink stick key elements. Different arrangements of feed channel keys can differentiate among ink stick colors, different formulations of ink for different models of printers, or other reasons that call for distinctions among ink sticks. The different arrangements can include different numbers of feed channel keys, different cross sectional shapes, and/or placement in different positions in the feed channel.

Figure 8:
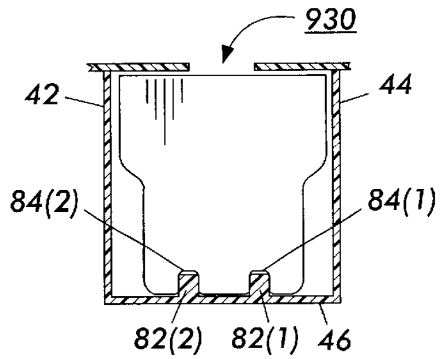
FIG. 8 is a cross-sectional view of yet another solid ink feed channel.
Figure 9:
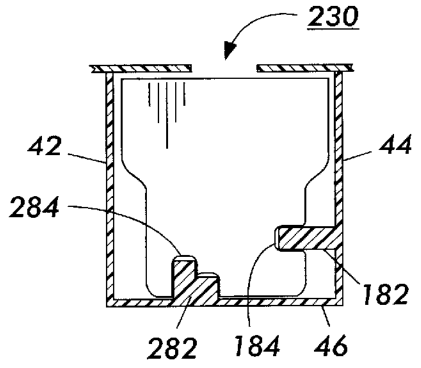
FIG. 9 is a cross-sectional view of a different solid ink feed channel.
Figure 10:
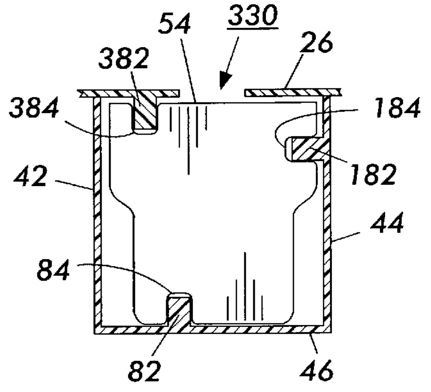
FIG. 10 is a cross-sectional view of another solid ink feed channel.

FIGS. 8, 9, and 10 illustrate how feed channel keys of different shapes, positions, and numbers can be used to differentiate among different types of ink sticks. Different combinations of feed channels such as those illustrated in FIGS. 4 and 7–10 can be incorporated into a single solid ink feed system in a single printer. Alternatively, a common feed key arrangement can be used in all feed channels of a particular printer, with different feed key arrangements used to differentiate among different printers. One type of feed key can be placed in all the feed channels of a particular model printer. Ink sticks intended for that model printer contain a corresponding feed key element. A feed key of a different size, shape, or position is placed in all feed channels of a different model printer. The different key of the second model printer blocks ink sticks having a feed key element for the first model printer, while permitting ink sticks having a feed key element corresponding to the second feed key to pass.

FIG. 8 illustrates an exemplary arrangement with multiple feed channel keys 82(1), 82(2) along a single surface of the feed channel. An ink stick 930 that can pass such feed channel keys 82(1), 82(2) has corresponding ink stick key elements 84(1), 84(2). FIG. 9 shows an example of using a feed channel key 282 of a different shape. The feed channel key 282 permits passage of an ink stick 230 having an ink stick key element 284 that is correspondingly shaped (or larger) and positioned. FIG. 9 also illustrates that channel keys 182, 282 of different shapes and locations can be combined in a single feed channel for additional keying capabilities. FIG. 10 illustrates that a feed channel key 382 can project into the feed channel from the underside of the key plate 26. Such a top feed channel key permits passage of an ink stick 330 having an ink stick key element 384 formed in the top surface 54 of the ink stick body.

In one particular implementation, the feed channel key 82 projects into the feed channel 28 at only one point along the length of the longitudinal feed channel, as seen in FIG. 3. The feed channel key 82 shown in FIG. 3 provides a keying means that prevents an ink stick from passing the point in the feed channel having the key unless the ink stick has a correspondingly shaped key element. Alternatively, the feed channel key 82 can extend along all or a substantial portion of the length of the feed channel.

Figure 11:
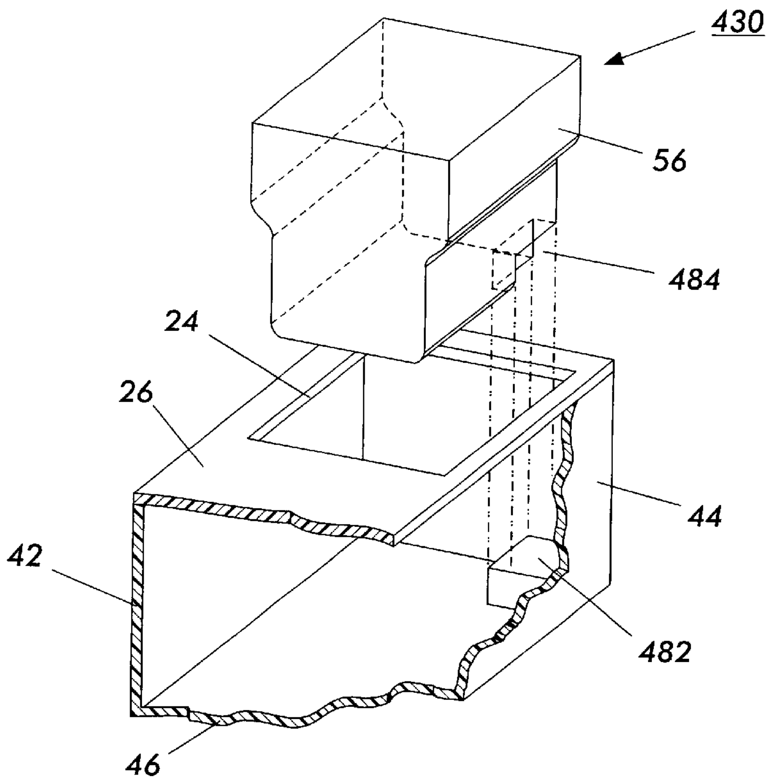
FIG. 11 is a perspective view, partially in cross-section, of a solid ink feed channel.
Figure 12:
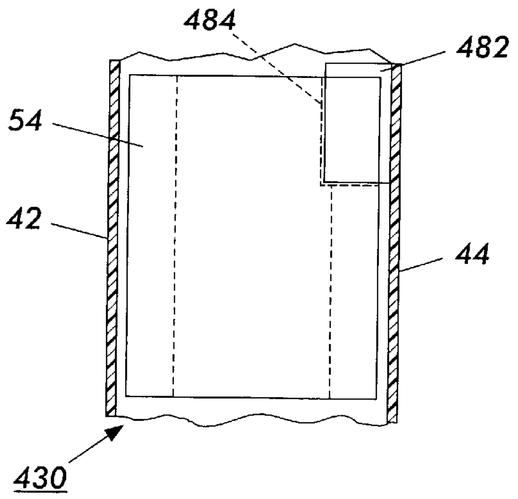
FIG. 12 is a top sectional view of a portion of the solid ink feed channel of FIG. 11.

A feed channel key 482 can be placed in the feed channel immediately below the keyed opening 24 through the key plate 26, as shown in FIGS. 3, 11, and 12. (The illustrations of FIGS. 11–14 are simplified by not showing insertion keys on the perimeter of the openings 24 through the key plate 26, or the corresponding key elements in the side surfaces of the ink stick body.) By positioning the feed channel key 482 directly below the key plate opening, an ink stick whose outer perimeter shape passes through the key opening of the key plate is not able to be fully inserted into the feed channel 28 unless it also has the appropriately shaped and positioned key element 484 formed in the ink stick body. Such insertion depth keying provides an additional level of discrimination for insuring that only proper ink sticks are inserted into the feed channel. Feed channel keys 82 along the path of ink stick travel in the feed channel, and feed channel keys 482 directly below the key plate opening 24 can be used either separately or in combination to block passage of an incorrect ink stick.

Figure 13:
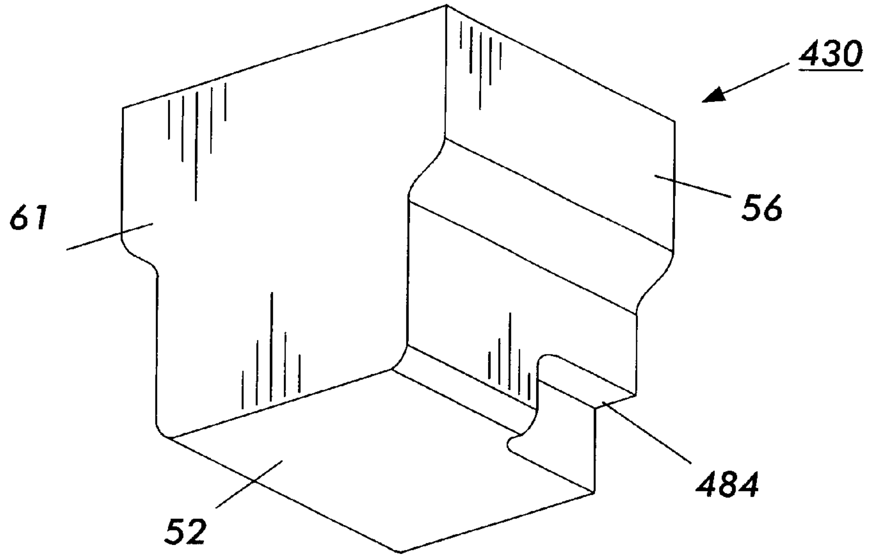
FIG. 13 is a perspective view of another embodiment of a solid ink stick.
Figure 14:
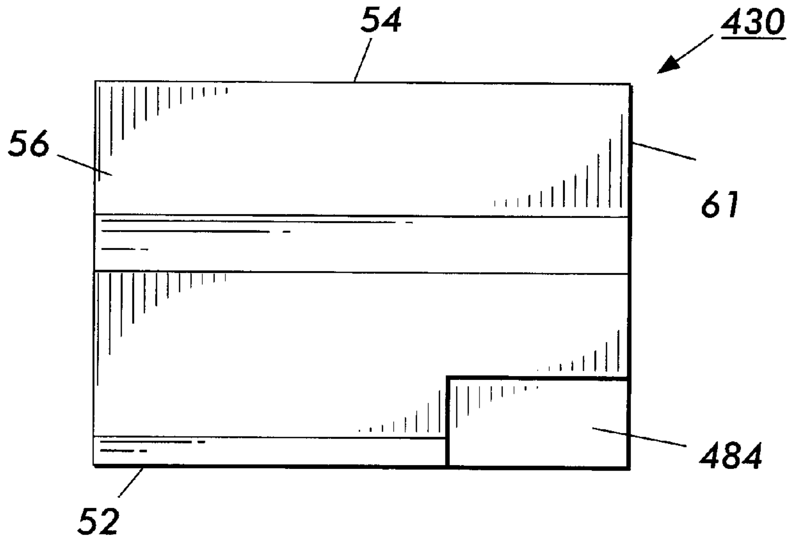
FIG. 14 is a side elevational view of the solid ink stick of FIG. 13.

Referring to the implementation shown in FIGS. 11 and 12, the insertion depth feed channel key 482 protrudes into a portion of the insertion end of the feed channel into which the ink stick 430 is initially inserted. This key extends from the floor 46 or support rib of the feed channel up only a portion of the height of the feed channel between the floor 46 and the key plate 26. The corresponding ink stick key element 484 in the ink stick body is formed with a complementary shape. For example, with a protruding feed channel key 482, the ink stick key element 484 is a recessed portion of the ink stick body. Referring to FIGS. 13 and 14 in addition to FIGS. 11 and 12, this recessed ink stick key element 484 extends through the rear or trailing end surface 61 of the ink stick body. Extending the key element 484 through the rear end surface of the ink stick allows the ink stick to proceed along the length of the feed channel once the ink stick has been fully inserted into the feed channel. The illustrated implementation includes an insertion depth feed channel key 482 at or near one side of the feed channel, and a corresponding ink stick key element 484 formed as a recess along the bottom surface 52 and one of the side surfaces 56 of the ink stick body. However, the insertion depth feed channel key can be positioned between the sides of the feed channel so that the corresponding ink stick key element 484 is formed through the bottom surface 52 of the ink stick body between the lateral side surfaces 56. More than one key can be used in a particular feed channel. Different cross sectional shapes perpendicular to the feed direction of the ink stick can provide differentiation to block incorrect ink sticks. In addition, different numbers and/or positions of the feed channel key also permits differentiation among ink stick types.

The insertion depth feed channel key 482 under the insertion opening 24 can extend along the entire length of the insertion opening, or can extend along only a portion of the length (such as the portion farthest from the melt plate at the end of the feed channel). If the feed channel key extends along only the portion of the length of the opening farthest from the melt plate, the ink stick key element 484 can be formed along only a corresponding portion of the length of the ink stick, as shown in FIGS. 11–14. The ink stick key element extends through the trailing end of the ink stick, so that after being fully inserted into the feed channel, the ink stick can proceed along the feed channel toward the melt plate.

Figure 15:
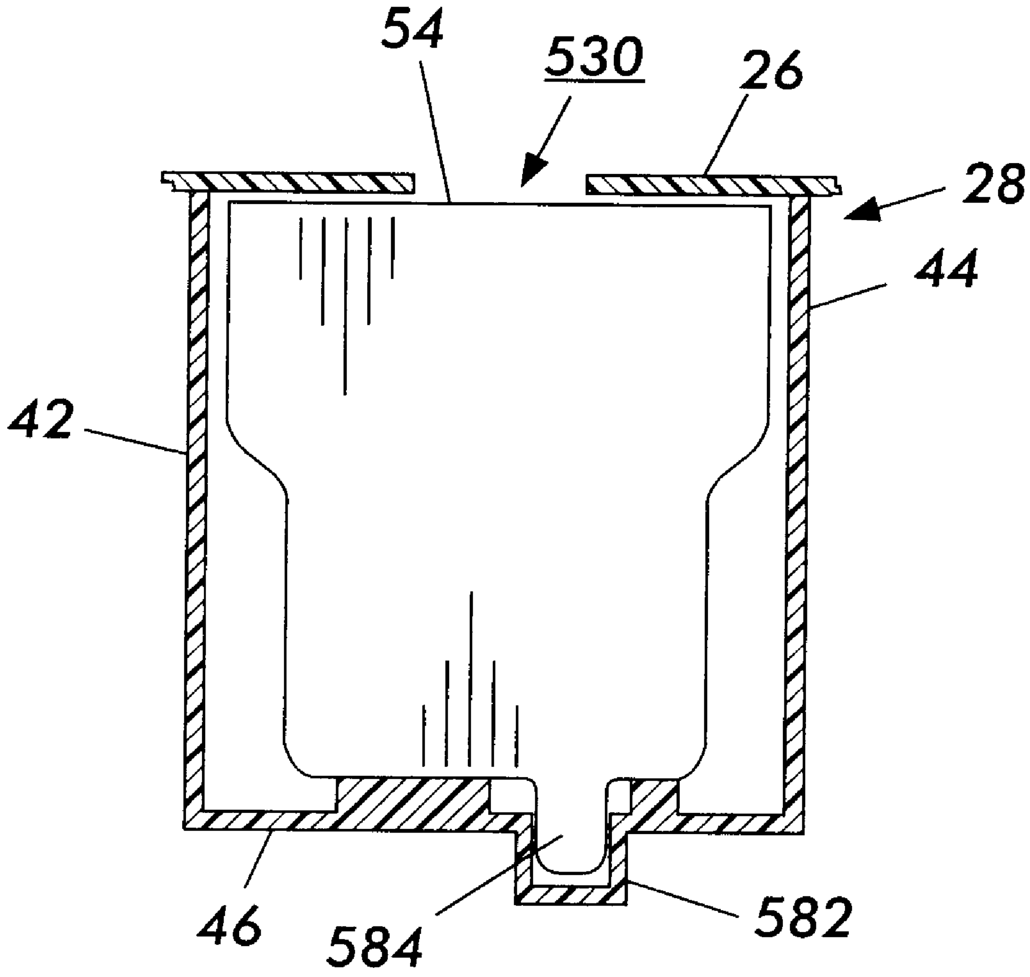
FIG. 15 is a cross-sectional view of yet another solid ink feed channel.

FIG. 15 shows an arrangement in which a feed channel key 582 is recessed in the feed channel wall 46, and a corresponding ink stick key element 584 projects from one of the surfaces of the ink stick body. The projecting ink stick key element 584 blocks the ink stick 530 from any ink feed channel that does not include a correspondingly shaped and positioned feed channel key 582.

Those skilled in the art will recognize that corners and edges may have radii or other non-sharp configurations, depending on various factors, including manufacturing considerations. After studying the above description and accompanying illustrations, those skilled in the art will recognize that a wide variety of shapes and particular configurations for the key elements are possible. Combining different numbers, sizes, shapes, and positions of feed channel keys and their corresponding ink stick key elements permits feed key discrimination among a significant number of ink stick types. Therefore, the following claims are not to be limited to the specific implementations described and illustrated above.

We claim:

1. An ink stick for use in a solid ink feed system of a phase change ink jet printer, the ink stick comprising:

an ink stick body, wherein the ink stick body comprises:
a front;
a rear; and
a bottom surface connecting the front and the rear; and at least one key element formed in the bottom surface;

wherein the key element extends along the bottom surface through the rear of the ink stick body; and wherein the key element corresponds in shape and position to a feed channel key in a longitudinal feed channel of the solid ink feed system so that the ink stick key element passes the feed channel key after the ink stick has been at least partially inserted into the longitudinal feed channel.

2. The ink stick of claim 1, wherein:

the ink stick body has a shape that permits the ink stick to be inserted partially into the longitudinal feed channel; and the key element corresponds in shape and position to a feed channel key that would otherwise prevent the ink stick from being fully inserted into the feed channel.

3. The ink stick of claim 1, wherein:

the ink stick body has a shape that permits the ink stick to be inserted fully into a segment of the longitudinal feed channel; and the key element corresponds in shape and position to a feed channel key that would otherwise block movement of the ink stick along the longitudinal feed channel.

4. An ink stick for use in a feed channel of a solid ink feed system of a phase change ink jet printer, the ink stick comprising:

an ink stick body;

keying means formed in a bottom surface of the ink stick body for permitting the ink stick to be at least partially inserted into a keyed feed channel of the solid ink feed system without engaging a keyed segment of the keyed feed channel, and to pass through the keyed segment of the keyed feed channel only if the keying means in the ink stick body corresponds to the keyed segment of the feed channel.

5. The ink stick of claim 4, wherein the keying means corresponds to a key element in the bottom of the feed channel.

6. The ink stick of claim 4, wherein the feed channel of the solid ink feed system is longitudinal, and wherein:

the ink stick is adapted to be fully inserted into the feed channel and to pass along a portion of the length of the longitudinal feed channel without engaging the keyed segment of the keyed feed channel; and the keying means permits the ink stick to pass a feed channel key as the ink stick passes along an additional portion of the length of the feed channel.

7. The ink stick of claim 4, wherein:

the ink stick is adapted to be partially inserted into the feed channel without engaging the keyed segment of the feed channel; and the keying means permits the ink stick to be inserted fully into the keyed segment of the keyed feed channel.

8. The ink stick of claim 7, wherein:

the ink stick body has a length;

the ink stick body comprises a three dimensional body having a bottom surface extending along the length of the ink stick body; and the ink stick key element comprises a recess formed along only a portion of the length of the bottom surface.

9. A method of feeding solid ink to a melt plate of a phase change ink printer, the method comprising:

placing an ink stick at least partially into a solid ink feed channel wherein:
one end of the feed channel is adjacent the melt plate;
moving the ink stick along the solid ink feed channel past a feed channel key in the bottom of the solid ink feed channel if the ink stick has a key element corresponding to the feed channel key; and
blocking the ink stick at the feed channel key in the solid ink feed channel if the ink stick does not have a key element corresponding to the feed channel key.

10. The method of claim 9, wherein:

placing the ink stick in a solid ink feed channel comprises placing the ink stick partially in the solid ink feed channel; and blocking the ink stick if the feed channel key comprises blocking the ink stick from full insertion into the feed channel.

11. The method of claim 10, wherein blocking the ink stick from full insertion into the feed channel comprises using the feed channel key to block a bottom surface of the ink stick.

12. The method of claim 10, wherein moving the ink stick past a feed channel key comprises moving an ink stick key element having a key shape in a bottom surface of the ink stick, the key shape corresponding the feed channel key, past the feed channel key.

13. The method of claim 9, wherein:

placing the ink stick in a solid ink feed channel comprises fully inserting the ink stick in the solid ink feed channel; and the method additionally comprises moving the ink stick along a portion of a length of the feed channel prior to either the moving or blocking steps.

14. The method of claim 9, additionally comprising, after placing the ink stick in the solid ink feed channel, moving the ink stick along at least a portion of the length of the solid ink feed channel, and wherein:

moving the ink stick along the solid ink feed channel comprises, after moving the ink stick along at least a portion of the length of the solid ink feed channel, moving the ink stick past the feed channel key; and blocking the ink stick at the feed channel key comprises, after moving the ink stick along at least a portion of the length of the solid ink feed channel, blocking the ink stick at the feed channel key.

15. A solid ink feed system for a phase change ink jet printer, the feed system comprising:

at least one solid ink feed channel; and feed channel keying means to block passage along the feed channel of an ink stick that does not have a corresponding ink stick keying means in the bottom portion of the ink stick, wherein the feed channel keying means permits an ink stick to at least partially enter the feed channel, even if the ink stick does not have ink stick keying means corresponding to the feed system keying means.

16. The solid ink feed system of claim 15, wherein the keying means comprises a feed channel key formed in the feed channel.

17. The solid ink feed system of claim 16, wherein the feed channel key comprises a protrusion into the feed channel.

18. The solid ink feed system of claim 15, additionally comprising:

an ink stick;

wherein the ink stick has an ink stick keying means in the bottom portion of the ink stick.

19. The solid ink feed system of claim 18, wherein the ink stick keying means comprises a recessed key element that extends along at least a portion of the length of the ink stick.

20. The solid in feed system of claim 19, wherein the ink stick recess is shaped to permit the ink stick to pass the feed key element protrusion in the feed channel.

21. The solid ink feed system of claim 15, wherein the keying means blocks full insertion of the ink stick into the feed channel unless the ink stick has the corresponding ink stick keying means.

22. The solid ink feed system of claim 15, wherein the keying means permits an ink stick that does not have the corresponding ink stick keying means to fully enter the feed channel.

* * * * *